April 28, 1970 W. E. GLENN, JR 3,508,920

THREE-DIMENSIONAL PICTURES AND METHOD OF MAKING

Filed April 18, 1967

2 Sheets-Sheet 1

Inventor:
William E. Glenn Jr.,
by Richard R. Brainard
His Attorney.

Inventor:
William E. Glenn Jr.,
by Richard R. Brainard
His Attorney.

3,508,920

THREE-DIMENSIONAL PICTURES AND METHOD OF MAKING

William E. Glenn, Jr., Scotia, N.Y., assignor to General Electric Company, a corporation of New York Continuation-in-part of application Ser. No. 495,276, Oct. 12, 1965. This application Apr. 18, 1967, Ser. No. 631,770
Int. Cl. G03c *9/00*
U.S. Cl. 96—40 11 Claims

ABSTRACT OF THE DISCLOSURE

A method of printing three dimensional pictures of the type including a plurality of picture elements arranged in groups with each group viewed through an overlying lenticular lens and with the picture elements of each group each taken from a different vantage point, which method includes the production of a halftone picture with the dimension of the width of the halftone dots being equal to the width of the picture elements and the maximum length of the dots along the picture elements being several times that dimension, e.g., equal to the width of a lenticular lens element. The pictures taken from different vantage points are each converted to a continuous tone picture and then to a set of halftone pictures by exposing films through a halftone screen ruled in a single direction. The composite halftone picture is then made by imaging these halftone pictures on a film through a lenticular lens sheet on the film or other image area. The halftone dots in adjacent picture elements may be displaced along the picture elements by an amount equal to one-half the maximum dimension of the dots in that direction.

This application is a continuation-in-part of my application Ser. No. 495,276, filed Oct. 12, 1965, entitled "Method and Apparatus for Making Three-Dimensional Pictures," and assigned to the assignee of the present invention.

There is an increasing interest in making good quality three-dimensional pictures, particularly in color, and some pictures of this type have recently appeared in national magazines. In one form, these pictures are made up of a plurality of sets of strip-like picture elements with each set viewed through one lenticule of a lenticular sheet or screen overlying the print. As pointed out in the above mentioned application Ser. No. 495,276, the apparent quality of the print as seen by the viewer is determined to a considerable degree by the accuracy of registration of the lenticules of the screen with the sets of picture elements with which they are associated.

In addition, the composite picture places a premium on high resolution, since the amount of picture information for a given scene is multiplied by the number of vantage points from which the scene is photographed. Accordingly, it is an important object of the present invention to provide a high resolution three-dimensional halftone picture and an improved method of making.

It is another object of the present invention to provide improved gray scale reproduction and improved resolution in lenticular pictures.

Since many color pictures are printed by a plurality of separate printing steps corresponding to the different color components and to a black and white picture, it is apparent that many of the features of the present invention are equally applicable to color and black and white pictures.

One method of taking three-dimensional pictures and reproducing them is described in an article by Leslie P. Dudley entitled "Autostereoscopic Lunar Photography,"

appearing in the October 1961 Journal of the Society of Motion Picture and Television Engineers 70, pages 799–803. As there described, particularly on page 800 under the heading "The Panoramic Parallax Stereogram," a black and white picture is taken by a number of cameras in closely spaced, side-by-side relation so that a number of pictures of the same scene are taken from a plurality of vantage points, the number corresponding to the number of picture elements in each group of the lenticular picture to be produced. A set of picture elements is made up of interdigitated picture elements, one element from the film of each of the cameras, so that each set of picture elements appearing under one lenticule of the viewing screen represents an elemental portion of the total scene as viewed by each one of the cameras, and adjacent pairs of these picture elements in a single set form a stereoscopic pair. Whether or not the stereoscopic pairs of elements are adjacent or spaced by two or more picture elements depends upon the spacing of the cameras and distance to the scene as compared to the interocular distance and the viewing distance, i.e. the camera angles and viewing angles.

In accordance with an important feature of the invention, the composite picture is produced by projecting the scenes taken by the various cameras through what is essentially a halftone screen ruled only in a horizontal direction, i.e. in a direction orthogonal to the direction of the picture elements of the interdigitated image.

The maximum dimension of the halftone dots in a vertical direction is several times the width and preferably corresponding dots in adjacent picture elements are displaced along the picture elements by a fraction, e.g. one-half, the maximum dimension of the dots. In a preferred embodiment of the method, the enlarged halftone prints are prepared before the interdigitated three dimensional picture, so that only transparent and opaque areas are involved when making the very narrow picture elements of the three-dimensional picture. Further objects and advantages will become more apparent as the following description proceeds, reference being had to the accompanying drawings, and its scope will be pointed out in the appended claims.

Figure 1:
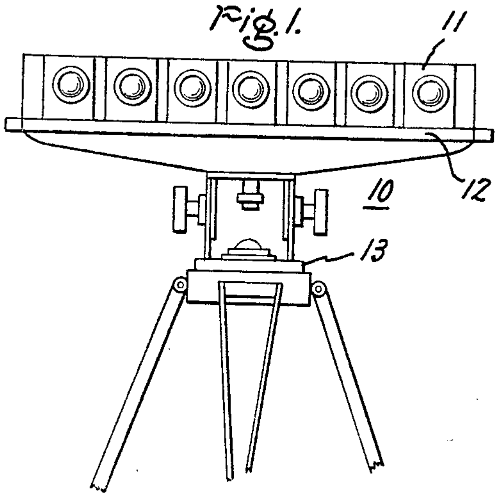
FIG. 1 is an elevational view showing in outline a camera arrangement suitable for taking three-dimensional pictures.
Figure 2:
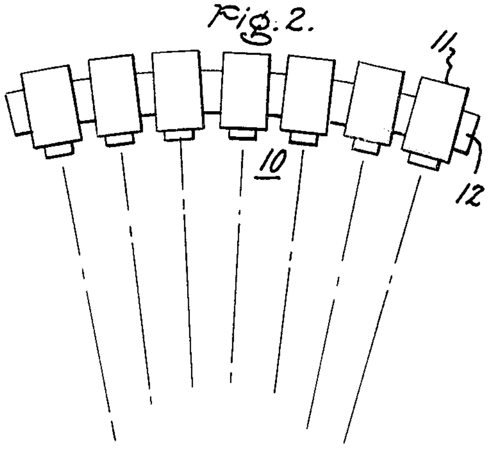
FIG. 2 is a plan view in outline of the camera arrangement of FIG. 1.

A suitable multiple camera arrangement for taking pictures to be reproduced in accordance with the present invention is shown in FIGS. 1 and 2 of the drawing. The camera assembly 10 is made up of a number of individual cameras shown in outline at 11, all mounted on a support 12 in the same horizontal plane and preferably on the arc of a circle, as shown in FIG. 2. The assembly is preferably mounted on an adjustable support such as a tripod 13. The cameras are compact and are particularly so in a horizontal direction so that several cameras occupy a horizontal distance equal to the spacing between the eyes of an individual who is to view the image. For example, the center-to-center spacing of the cameras may be approximately one and one-half inches. The number of cameras which corresponds to the number of picture elements that will appear under each lenticule may be in the order of seven to ten, for example, seven having been illustrated in FIG. 1. In taking the picture, the film in each camera is simply exposed so that there are seven pictures taken from the seven vantage points corresponding to the locations of the individual cameras. An improved camera of the above general type is described and claimed in my application Ser. No. 620,844, filed Mar. 6, 1967, as a continuation-in-part of my application Ser. No. 495,276, filed Oct. 12, 1965.

Figure 3:
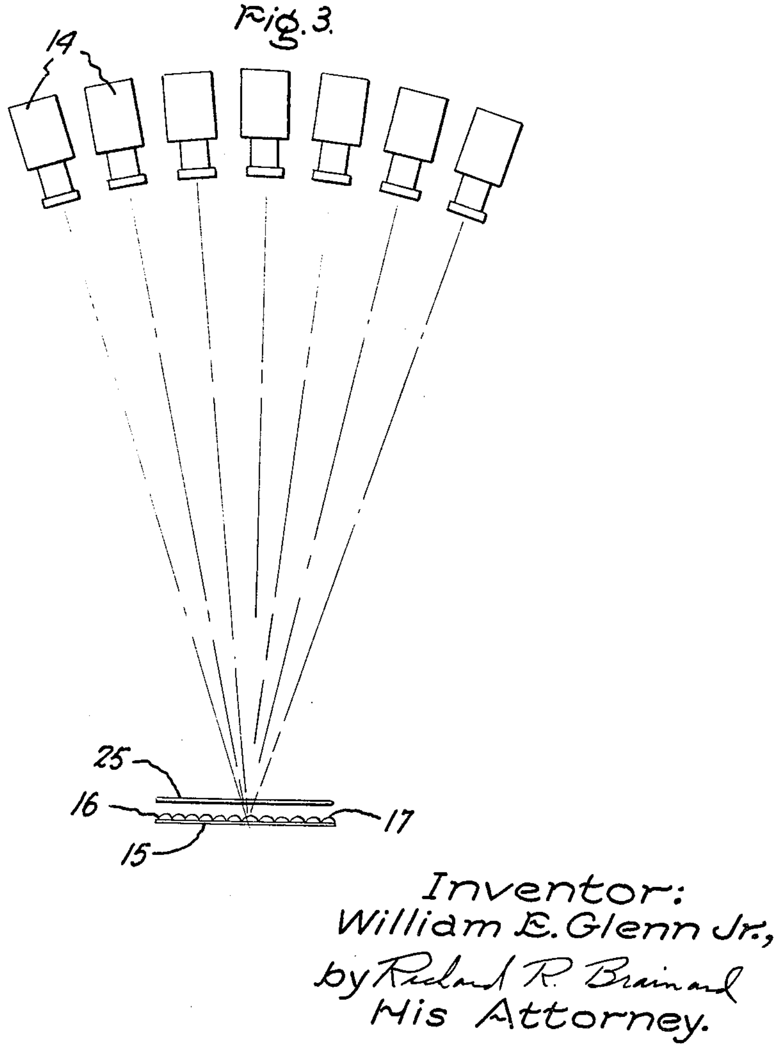
FIG. 3 is a schematic representation of a projection and enlarging system suitable for producing an interdigitated three-dimensional picture on a screen or on a high resolution film suitable for the preparation of a printing plate.

As described in detail and claimed in my copending application Ser. No. 631,772, filed concurrently herewith as a continuation-in-part of said application Ser. No. 495,276, filed Oct. 12, 1965, the apparatus of FIG. 3 provides for the carrying out of an improved method of enlarging and composing a three-dimensional picture in accordance with which the scenes taken from the individual vantage points may be projected on an image area of a screen and the apparent plane of the three-dimensional picture, or plane of sharp focus of the picture, determined by adjusting the position of the projectors until the objects in that plane produced from the different projectors are in exact registry. Objects in other planes will not appear in exact registry and will provide the three-dimensional aspect of the picture. In addition to this, the picture may be viewed through a lenticular screen to see how the finished three-dimensional picture will look. At this stage, the light level of the individual projectors can be adjusted, and the color component contributed by each projector may be adjusted by suitable color filters when color prints are being made, all as described in more detail and claimed in the above mentioned concurrently filed application. After the picture has been composed as described above, the improved composite picture or the printing roll for printing is prepared.

Referring again to FIG. 3, and assuming that the individual projectors 14 have been positioned to compose the enlarged picture on an image plane, the pictures as taken by each of the cameras are now enlarged and recorded on a high resolution black and white film shown at 15, such as sold on the market under the trade name "Kodalith," which may be developed and used for the preparation of a printing plate or printing roll in accordance with well known processes. Supported in front of the film in closely spaced relation thereto is a thin lenticule plate 16 made up of a large number of vertically extending lens elements 17 each in the shape of a cylindrical segment. These may be formed in many ways well known in the art and may, for example, be formed in a thermoplastic material. The optics of the system are such that each lenticule focuses a portion of the lens of each projector on the film 15 in adjacent strips so that an image of a small area of the scene as viewed by each camera is printed in adjacent relation under each lenticule. The portion of the scene which is printed progresses from one side of the scene to the other as one progresses from one side edge of the film 15 to the other, so that picture elements taken from each of the vantage points form a set under each lenticule, and these sets, under the total number of lenticules covering the scene area, depict the entire picture in stereographic form. While it is possible that the adjacent picture elements will form a stereoscopic pair, in accordance with the preferred arrangement of my invention the cameras are more closely spaced than the ocular spacing of an observer, so that every third element forms one element of a stereoscopic pair.

Figure 4:
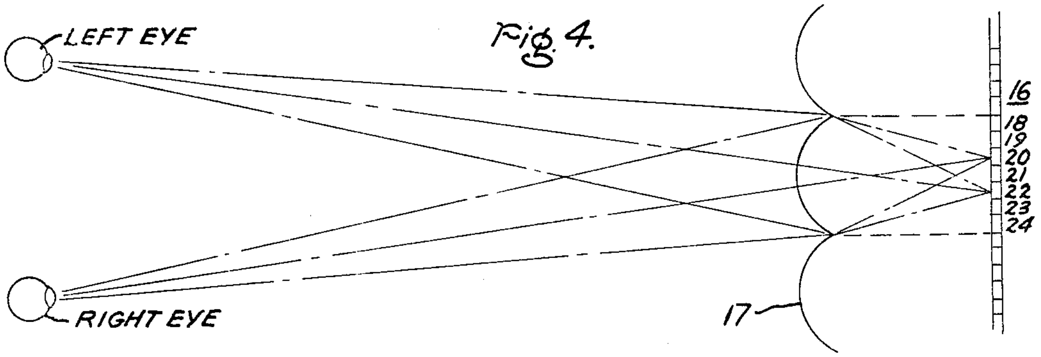
FIG. 4 is an enlarged view showing the manner in which the lenticule serves to focus light from one picture element from each set on the left eye of an observer and light from another picture element on the right eye of an observer to produce the stereoscopic effect.

The enlarged view shown in FIG. 4 illustrates the manner in which light emanating from the picture elements 18–24, inclusive, is imaged on the eyes of an observer. As illustrated, light from picture element 20 is shown focused on the left eye of the observer, and light from element 22 is imaged on the right eye of the observer. The permissible range of viewing as far as the position of the observer is concerned covers that lateral displacement which is permitted without viewing light emanating from a picture element in one group through a lens element overlying an adjacent group. This means that the observer has a freedom of movement which is determined by the number and width of picture elements, i.e. the width of a group of picture elements under one lenticule, and the focal length of the lenses of the lenticular plate.

The lenticular plate 16 may include lenses 17 which are about 10 mils in width, i.e. they are about one-hundredth of an inch wide, and may be formed on a sheet of glass or thermoplastic and may be molded or pressed in the glass or pressed into the thermoplastic when it is in a softened state. The distance from the lens face at the center to the picture surface is about 17 mils. The general type of stereoscopic picture thus far described is well known and is described, for example, in the aforementioned article by Dudley.

Figure 5:
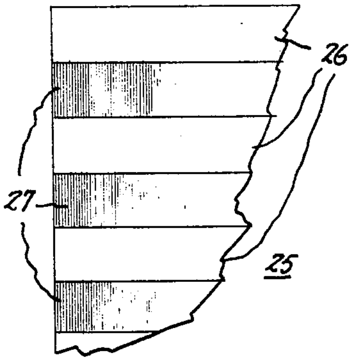
FIG. 5 is a schematic representation of a halftone plate suitable for use in the apparatus of FIG. 3.
Figure 6:
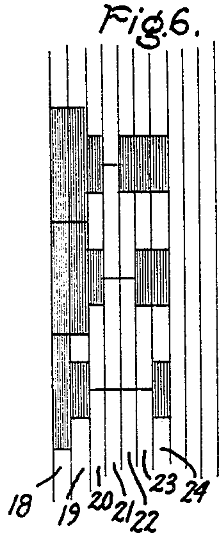
FIG. 6 is a schematic representation showing the printed halftone lenticular image resulting from the apparatus of FIG. 1 showing the gray scale rendition in the vertical direction along the length of the interdigitated picture elements.

In accordance with one feature of the present invention, the film 15 from which the printing plate is to be formed may be made as a halftone representation of the picture by utilizing a halftone screen 25 placed in front of the lenticular sheet 16 and ruled only in a horizontal directional, i.e. orthogonally with respect to the axes of the lenticules or, less preferably, at some other angle with respect to the axes of the lenticles 17. Such a screen is shown in elevation in FIG. 5. The screen is made up of alternately opaque and transparent strips 26 and 27 extending in a horizontal direction of about equal width and with alternate strips having a center-to-center spacing which may be about the same as the width of the lenticules, i.e. approximately 10 mils. The actual spacing to be used represents a compromise. If the center-to-center spacing is greater, better gray scale is realized but at the expense of vertical resolution. FIG. 6 is a schematic representation of the effect of the halftone screen on the size of the black and white areas of the image of the picture elements for black and for white and for an intermediate shade of gray.

With the halftone screens of the type described above, the screen is placed a small distance from the lenticular lens plate in the order of a sixteenth of an inch. It will be understood that other types of halftone plates, such as those employing gray scale, may be used. The art of halftone picture making is, in a broad sense, highly developed and well known to those skilled in the printing art.

As will be seen from FIG. 6, if the picture elements like the two left-hand elements 18 and 19, for example, are black at that point (top row of halftone dots), the total area is black. The fourth element 21 from the left is white, and it will be seen that then the height of the black area is reduced to zero. The third picture element 20 from the left is gray, and it will be noted that the height of the black area is intermediate the black and the white. The remaining elements 22, 23 and 24 are shown as being the same gray as element 20. In the second row of dots, elements 18 and 19 are black, 20, 23 and 24 are gray, and 21 and 22 are white, and in the third row 18 is black, 19 and 24 are gray, and 20–23 are white. The shades of gray in this halftone print are then determined by the height of the black areas. It is apparent that, with wider spacing in the halftone screen, the black areas for black will be of greater height and the gradation from black to white will provide a greater variation and a better gray scale. However, large changes in the ink areas are actually difficult to print with sharpness so that there is a certain loss of resolution in the horizontal direction. This leads to a compromise in which the height of black for black areas, i.e. the center-to-center spacing of the halftone screen, is approximately equal to the width of the lenticules.

In the preceding example, the lines of the halftone screen extend in a direction orthogonal to the picture elements so that the gray scale is determined entirely by the height of the black elements on each picture element, and the resolution is determined by the width of the picture elements in the horizontal direction. It will be appreciated by those skilled in the art that the rulings of the halftone screen may extend at an angle other than orthogonal to the picture elements. For example, an interleaving in a vertical direction of the halftone dots of horizontally adjacent picture elements may be produced if the transparent portions of the halftone screen extend at an angle such that the dark images produced by the halftone screen on adjacent picture elements are interleaved, i.e. they do not lie along a single horizontal line. The significant thing is that the halftone screen is ruled in only one direction and other than the direction of the picture elements, so that the resolution in the other direction is determined by the width of the picture elements and the lenticular plate.

In the method described above, the production of the interdigitated halftone three-dimensional pictures is accomplished by a single projection and exposure through a light path including a halftone screen and a lenticular lens sheet. While this is a simple and effective method requiring a minimum of film and a minimum of time, improved quality in the final picture is achieved by another embodiment of my invention in which the various steps are separated. In accordance with the improved method, halftone enlargements are produced prior to producing the interdigitated three-dimensional picture. In this way gray scale is not present in the halftone screen and the light is transmitted by a transparent area or a black area provided by the halftone dots. This greatly improves the quality of the resulting picture. In the specific example previously given, the picture strips are only about one-thousandth of an inch wide. With these dimensions, variations in film sensitivity have a detrimental effect which is essentially eliminated by the eliminaton of the gray scale of the continuous tone picture by converting to halftone transparencies prior to forming the interdigitated picture.

Figure 7:
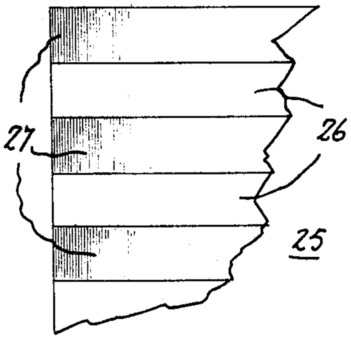
FIG. 7 is a schematic representation of a second halftone plate ruled in the same direction as the plate of FIG. 5, but with the transparent and opaque areas displaced with respect to those of the plate of FIG. 5 by one-half the width of a lenticule.
Figure 8:
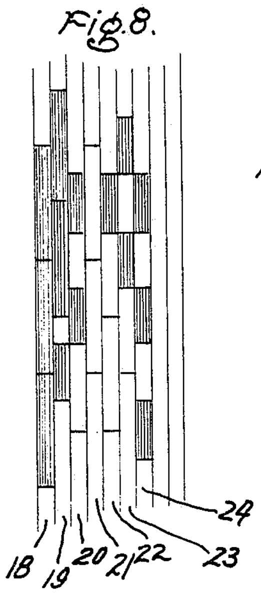
FIG. 8 shows the halftone three-dimensional picture structure resulting from the alternate use of the halftone plates for scenes taken from adjacent vantage points.

In accordance with this multistep method, the original recorded images, and preferably positives of these images, are converted to enlarged continuous tone negatives by utilizing the projectors of FIG. 3 in sequence to image the recording scenes on a high quality black and white film from which the negatives are developed. As before, these negatives are provided with registration notches or holes for registering the negatives in the holder in subsequent steps. The halftone transparencies are each produced by exposing high resolution film such as Kodalith to a light path including one of the continuous tone enlargements and a halftone screen such as the one described in FIG. 5. These items are placed in the order named in a suitable holder which retains them in proper positional relationship. This is essentially the making of contact halftone transparencies from the continuous tone negatives. Since these halftone screens are produced in sequence, the displacement of the halftone dots in adjacent picture strips is readily accomplished by exposing the continuous film negatives corresponding to adjacent camera locations to different halftone screens having their transparent and opaque portions displaced in the direction of the length of the picture elements, i.e. in the direction of the variable dimension of the halftone dots. Such a halftone screen is shown in FIG. 7 in which the transparent portions 26 and opaque portions 27 are displaced relative to the screen of FIG. 5 by a distance substantially less than the width of a lenticule and, in the embodiment shown, by one-half the width of a lenticule. Thus, by utilizing the halftone screens of FIGS. 5 and 7 for producing the halftone transparencies corresponding to the adjacent camera locations, a halftone transparency is produced with corresponding halftone dots in adjacent picture elements displaced one-half the maximum height of the halftone dots. Such a picture is shown in FIG. 8.

While the production of the enlarged continuous tone pictures and the halftone transparencies as separate steps gives a method of greatest flexibility, it will be apparent that these two steps can be combined into a single step. The more important aspect of the multistep method of the present invention is the separation of the halftone production from the interdigitation of the three dimensional transparency.

After the enlarged halftone transparencies are produced, an interdigitated picture is produced by placing in the film holder in the following order a Kodalith or other high resolution film, a lenticular screen and then the halftone prints in succession, i.e. one exposure is made with each halftone print corresponding to a different camera location. The exposure is accomplished by the use of a point light source which is placed in different angular positions with respect to the film holder corresponding to the position of the projectors of FIG. 3, i.e. the angle of the light with respect to the plane of the film is the same as the angle made by the projection axis with the image plane in FIG. 3, so that the information from each camera location is recorded in one picture element of each group, i.e. one picture element under each lenticule.

In the preceding description, reference has been made to the use of a lenticular screen in making the interdigitated picture element. It is apparent that the function of the lenticular screen is to limit the light transmitted to the film from any projector location or, in the method described above, from the direction of the light source, to a single narrow strip corresponding to a picture element. While the lens system is a very easy optical means of accomplishing this, it is apparent that a set of fine line masks could be used for limiting the areas of the film exposed in a similar manner.

Figure 9:
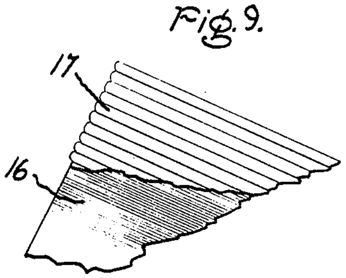
FIG. 9 is an isometric view showing the two layer material suitable for the production of the printed picture and lenticular plate making up the improved three-dimensional picture of the present invention.

As indicated earlier, the high resolution film produced in accordance with the foregoing methods to provide recorded interdigitated halftone pictures providing a composite of the pictures taken from the different vantage points may be used to prepare directly a printing plate or printing roll in accordance with processes well known in the art. Such a plate or roll may then be used to print the picture on a suitable ink receiving surface, such as shown at 16 in FIG. 9, and a thin layer of thermoplastic applied to the surface to provide the lenticular lens sheet through which the three-dimensional picture is viewed. The lenses may be preformed in mechanical manner and registered with the groups of picture elements by hand with the aid of a binocular microscope, or the lenticules may be formed in the overlying plastic film by means of control of an electron beam, as described in detail and claimed in my copending application Ser. No. 631,771, filed concurrently herewith, entitled "Method and Apparatus for Making Three Dimensional Pictures," and assigned to the assignee of the present invention.

It will be apparent from the foregoing detailed description that I have provided improved three-dimensional picture and method of making, particularly with respect to the resolution and gray scale exhibited by the finished picture.

While I have shown and described several embodiments of my invention, it will be apparent to those skilled in the art that many changes and modifications may be made without departing from my invention in its broader aspects, and I aim, therefore, in the appended claims to cover all such changes and modifications as fall with the true spirit and scope of my invention.

What I claim as new and desire to secure by Letters Patent of the United States is:

1. The method of producing a three-dimensional picture of the type adapted to be viewed through a lenticular screen including a plurality of narrow elongated picture elements extending in parallel adjacent relationship with predetermined picture elements forming stereoscopic pairs which comprises producing a plurality of recorded photographic images of the scene to be reproduced in the picture from a plurality of different horizontally spaced positions, exposing a light sensitive film to projected light from the plurality of images through light paths including a lenticular screen having elongated lenticules extending in the direction of the elongated picture elements and controlling the light projected on said film by a halftone screen ruled in one direction only at a substantial angle with respect to the direction of the length of said picture elements.

2. The method of claim 1 wherein the halftone screen is ruled in a direction substantially orthogonal to the direction of the length of the picture elements.

3. The method of producing a three-dimensional picture of the type adapted to be viewed through a lenticular screen and including a plurality of narrow elongated picture elements extending in parallel adjacent relationship with predetermined picture elements forming stereoscopic pairs which comprises producing a plurality of recorded photographic images of the scene to be reproduced in the picture from a plurality of different horizontally spaced positions, producing an enlarged halftone print corresponding to each recorded image with halftone dots having a variable dimension in only one direction, at a substantial angle with respect to the long dimension of said picture elements, and producing a halftone interdigitated print from the halftone prints by exposing a light-sensitive film to light passing through each of said halftone prints and confining the areas of the film exposed to light passing through any one of the prints to a succession of spaced elongated narrow picture elements equal in number to the number of lenticules to be used for viewing and spaced by a distance equal to the width of a lenticule.

4. The method of claim 3 wherein the dots have a width equal to the width of the picture elements in a direction orthogonal to the variable dimension thereof.

5. The method of claim 3 wherein the halftone dots in the prints corresponding to images taken from adjacent vantage points are displaced along the direction of the picture elements by an amount less than the maximum dimension of the halftone dots in that direction.

6. The method of claim 5 wherein the displacement is one-half the maximum dimension of the halftone dots in the direction of the length of the picture elements.

7. The method of claim 3 wherein the spacing and width of the picture elements are produced by using a plurality of laterally spaced light source positions, one for each halftone print and a lenticular lens sheet overlying the light sensitive film.

8. A three dimensional picture of the type comprising a plurality of picture elements arranged in groups with each of the elements of a group taken from a different vantage point and adapted to be viewed through a sheet of lenticular lenses, each lens of which overlies a group of picture elements, the improvement comprising a halftone picture having halftone dots with a dimension in the direction of the width of the picture element approximately equal to the width of a single picture element and a substantially greater maximum dimension along the length of the picture element.

9. A picture as defined in claim 8 wherein the halftone dots have a maximum dimension along a picture element approximately equal to the width of a group of picture elements.

10. The picture of claim 8 in which the halftone dots of adjacent picture elements are displaced along the picture elments by approximately one-half the maximum dimension of the halftone dots in that direction.

11. The method of claim 3 wherein enlarged continuous tone prints are prepared corresponding to each of the recorded photographic images taken from the different positions and the corresponding halftone prints then produced from the enlarged continuous tone prints.

References Cited

UNITED STATES PATENTS

| | | | |
|---|---|---|---|
| 2,854,335 | 9/1958 | Mahler | 96—40 |
| 3,241,429 | 3/1966 | Rice et al. | 88—1 |
| 2,560,538 | 7/1951 | Ayres | 96—40 |

NORMAN G. TORCHIN, Primary Examiner

J. R. HIGHTOWER, Assistant Examiner

U.S. Cl. X.R.

96—45